United States Patent Office 3,833,669
Patented Sept. 3, 1974

3,833,669
MANUFACTURE OF POLYALKYLENE ETHERS
Robert Gehm, Limburgerhof, and John J. Hutchison, Ilvesheim, Germany, assignors to BASF Wyandotte Corporation, Wyandotte, Mich.
No Drawing. Filed Dec. 7, 1972, Ser. No. 313,105
Claims priority, application Germany, Feb. 24, 1972, P 22 08 614.2
Int. Cl. C07c 41/12, 41/02
U.S. Cl. 260—615 B     5 Claims

ABSTRACT OF THE DISCLOSURE

Basic catalysts for the polymerization of alkylene oxides are removed from the resulting polyalkylene ether by precipitating the catalysts with carbon dioxide in the presence of basic magnesium salts. The resulting polyalkylene ethers are especially suited for use in polyurethane foams.

BACKGROUND

(1) Field of the Invention

This invention concerns a process for making pure polyalkylene ethers by polymerization of alkylene oxides in the presence of basic catalysts and precipitation of the catalysts after completion of the polymerization in the presence of basic magnesium salts, the precipitating agent is carbon dioxide.

(2) Description of the Prior Art

The preparation of polyalkylene ethers by polymerization of alkylene oxides which add to an initiator containing reactive hydrogen atoms in the presence of alkaline catalysts is well known. Polyalkylene ethers with terminal free hydroxyl groups, a part of which contain terminal alcoholate groups because of the alkaline reaction medium, are obtained. For the further use of the polyalkylene ethers, it is necessary to transform the alcoholate residues of the polymerisates into free hydroxyl groups, and to do this in such a manner that the polymers practically will no longer contain any inorganic residue components which may be determined by ashing or buffer effects.

To achieve this, the alkali containing polymerisates are generally neutralized with inorganic or organic acids, which causes the formation of emulsions consisting of aqueous salt solutions and polyalkylene ethers. Subsequently the water from the emulsions is removed by distillation with a progressive increase in temperature. The remaining salts which precipitate out in the polyether are then mechanically separated.

If inorganic acids such as sulfuric acid, phosphoric acid, hydrochloric acid or acid reacting salts such as potassium hydrogen phosphate or organic acids such as citric acid, tartronic acid, etc., are used for the neutralization of the polymers, it is necessary to neutralize exactly to the equivalence point in order to on the one hand obtain a minimum of basic residual alkali salts or on the other hand to achieve a minimum of excess acid. Furthermore, the alkali salts frequently occur in such fine crystalline states, that filtration, despite the use of filtration aids, presents difficulties. Furthermore, with the use of sulfuric acid, discoloration of the polyalkylene ethers can occur.

The difficulty of having to very exactly arrive at the equivalence point during the neutralization, can, according to details described in U.S. Pat. No. 3,016,404, be overcome through the use of a volatile acid, such as hydrogen chloride. In this procedure the excess hydrogen chloride is removed as a gas by distillation. The procedure is saddled with the disadvantage that hydrogen chloride is strongly corrosive to the reactor materials and that the excess gas must be destroyed by means of expensive absorption and washing towers in order to prevent air pollution.

According to disclosures in the British Pat. No. 877,269, acid treated clays are being used for the neutralization of polyalkylene ethers. The disadvantages of this procedure are the handling of solids, which may present difficulties especially with larger reaction batches, since up to about 4 percent by weight of such clays, based on the polyether weight, are required for the neutralization of the polymers. In order to achieve a clear filtrate, the filtration of such clays requires a very dense filter medium which again results in very prolonged filtration cycles.

Other proposals for the purification of the products in question involve a scheme to dilute the polyalkylene ethers with a water insoluble solvent and to wash the resulting solution with water. This procedure however becomes rather elaborate because of the subsequent solvent recovery equipment required. A further difficulty resides in the ease of emulsion formation.

Equipment wise, and as regards the use of auxiliary agents, those procedures which use ion exchangers for the neutralization of the reaction solution are also relatively expensive. This requires processing in the presence of diluents, which subsequently must be separated and regenerated. In order to avoid high product losses, the ion exchangers must be washed completely free of product before regeneration.

Additional proposals towards the removal of the basic catalyst address themselves towards a scheme to neutralize the reaction solution with carbon dioxide and subsequently to render the product anhydrous under reduced pressure. This procedure is saddled with the disadvantage that the basic catalyst frequently is only incompletely neutralized, that the alkali carbonate which has been produced is very difficult to filter because of the very fine particle size, and therefore an insufficiently purified polyalkylene ether polyol results.

For the reasons stated, it has heretofore in many cases been impossible—without lengthy post treatment of the products—to prepare polyalkylene ethers by conventional procedures on a technical scale, which simultaneously are ash free, colorless and odorless.

This invention now makes it possible to avoid these disadvantages and to produce in a technically simple procedure, almost completely ash free, colorless and odorless polyethers.

SUMMARY OF THE INVENTION

The process of manufacturing polyalkylene ethers by the polymerization of alkylene oxides containing 2 to 4 carbon atoms in the alkyl chain in the presence of basic catalysts is improved when after the polymerization is halted, the basic catalysts are precipitated with carbon dioxide in the presence of a basic magnesium salt.

Through the use of this invention it is possible to prepare polyalkylene ether polyols with a residual alkali content of less than 2 p.p.m.

DESCRIPTION OF THE PREFERRED EMBODIMENT

The use of the gaseous, easily measured carbon dioxide, offers the advantage that the precipitating agent causes no side reactions, such as esterification or dehydration and that an excess of precipitating agent can be easily removed. Furthermore, carbon dioxide only has a very mild tendency to be corrosive to the reactor vessel materials. A further advantage of the invention is that the precipitation of the basic catalysts in the presence of basic magnesium salts forms difficultly soluble alkali-magnesium carbonate-double salts which precipitate in a coarsely crystalline form. The salts are easily separated so that losses of polymerisate are very low.

The manufacture of the polyalkylene ethers is carried out according to conventional, known methods of preparation. Alkylene oxides with from two to four carbon atoms are condensed in the presence of alkaline catalysts with themselves, or in general, with initiator molecules which contain active hydrogen atoms.

Suitable alkylene oxides are for instance; 1,3-propylene oxide, 1,2-butylene oxide, 1,3-butylene oxide and preferably ethylene oxide and 1,2-propylene oxide. The various alkylene oxides may be used singly, alternating with each other in sequence or as mixtures. Styrene oxide can also be used.

As initiator molecules containing active hydrogen atoms the following may be named as examples: water, alcohols, glycols, triols, phenols, amino alcohols, aliphatic or aromatic amines, diamines, triamines and hydrazones.

Conventional catalysts are those alkali alkoxides with from one to four carbon atoms in the alkyl chain, for instance sodium and potassium methylate, sodium and potassium ethylate, potassium isopropylate and sodium butylate and preferably alkali hydroxides such as sodium hydroxide and more preferably potassium hydroxide. Conventionally the catalyst is used in amounts of from 0.002 to 1.0 percent preferably in the range of 0.01 to 0.5 percent by weight, all percentages based on the total weight of the initiator component.

It is an essential characteristic of this invention that the basic polyalkylene ether solution, after completion of the polymerization, is treated in the presence of a basic magnesium salt with carbon dioxide. A still better crystallization of the precipitated alkali-magnesium carbonate-double salts is achieved by the presence of a few percent by weight of water.

Suitable basic magnesium salts are: magnesium oxide, magnesium carbonate and preferably magnesium hydroxide and basic magnesium carbonate. These compounds may be used singly or in mixtures, and with or without water in the various stoichiometric amounts or in excess.

If instead of magnesium salts, other basic alkaline earth salts, for instance calcium hydroxide, is used, then polyether polyols are obtained with a somewhat lower content of alkali metal ions which however are slightly colored, an undesirable property in many polyurethane use applications.

However, it is not unequivocally necessary to precipitate out the total alkali alkoxide or alkali hydroxide in the form of an alkali-magnesium carbonate-double salt. It has been found in fact, that even a partial formation of the alkali-magnesium double salt causes an excellent coagulation of the alkali carbonate which also is produced during the neutralization. Since the alkali content may vary widely and conventionally is between 0.001 and 1 percent by weight and above, in the reaction solution it is frequently suitable to add the basic magnesium salts in large excess, for instance up to a 1,000 fold excess based on the alkali content. In general however the basic magnesium salts are added to the reaction mixture in such amounts that per equivalent (part) of basic catalyst from 1 to 100, preferably from 1 to 20 equivalents (parts) of magnesium salt are introduced into the polyalkylene ether solution.

The neutralization of the basic catalysts with carbon dioxide can be carried out under pressure, preferably between 0.1 and 20 atmospheres excess pressure, more preferably between 1 and 5 atmospheres excess pressure or also with agitation of the reaction mixture at ambient pressure. If the neutralization is carried out at ambient pressure, the carbon dioxide can for example be conducted in gaseous form through the polyalkylene ether solution.

The amount of carbon dioxide required for the neutralization of the basic salts depends on the amount of basic catalyst contained in the reaction solution and the added amount of basic magnesium salts. Suitably, per equivalent of basic magnesium salts from 1 to 20, preferably from 2 to 10 equivalents carbon dioxide are used.

As has been mentioned already, it is advantageous to carry out the neutralization in the presence of water in order to obtain coarsely crystalline alkali-magnesium carbonate-double salts. The addition of water depends in first order of magnitude on the amount of basic magnesium salts needed and suitably amounts to between 1 to 10 parts, preferably from 1 to 5 parts the amount by weight of the magnesium salts.

In detail, the polyalkylene ethers are manufactured in such a manner that into a reaction mixture, consisting of initiator and basic catalyst, alkylene oxide, which can be diluted for instance with nitrogen, is introduced at temperatures of from 90 to 150° C., preferably 100 to 130° C. at such a rate as the alkylene oxide reacts, for instance over a period of from 2 to 30 hours, preferably from 5 to 10 hours where the addition may be carried out under atmospheric pressure or possibly under higher pressures of from 0.1 to 20, preferably 1 to 5 atmospheres excess pressure.

After completion of the polymerization, the excess alkylene oxide is removed by distillation at temperatures of from 100 to 150° C. under reduced pressure and the polyalkylene ether is treated in the presence of the basic magnesium salt, and possibly water, with carbon dioxide at temperatures of from 20 to 150° C., said temperatures preferably are in the range of 40 to 100° C. The reaction mixture is then stirred from 0.5 to 20 hours, preferably from 1 to 5 hours, after which period of time the reaction vessel is vented and any water which still may be present and other volatile side products are then removed under reduced pressure at temperatures between 50 to 100° C. Subsequently the alkali-magnesium carbonate-double salts and possibly any carbonate is removed in conventional manner, for instance by decanting the polyalkylene ether, or preferably by filtration, possibly in the presence of 0.1 to 1 percent by weight of filter-aid, based on the total weight of the reaction mixture.

The pure polyalkylene ethers according to this invention may have molecular weights of from 500 to 6,000 and depending on the type of products, viscosities of from 300 to 15,000 centipoise at 25° C.

The polyalkylene ethers in question are used as textile auxiliaries, surfactants and hydraulic fluids. The products are furthermore suitable for the manufacture of rigid, semirigid and flexible polyurethane foams.

This invention is further exemplified by the following examples. The parts mentioned in the examples are parts by weight. Volume parts stand in relation to parts by weight as liters do to kilograms.

EXAMPLE I

A reaction mixture consisting of 6.7 parts trimethylol propane and 0.673 parts of potassium hydroxide is made anhydrous under reduced pressure and then alkoxylated at 110° C. over a period of twelve hours by adding, with agitation, 200.5 parts of propylene oxide and subsequently 32.6 parts of ethylene oxide. The unreacted residual alkylene oxides are removed by stripping under reduced pressure at 100° C. in approximately 30 minutes. The crude polyether polyol contains 0.19 percent by weight of potassium ions and has a hydroxyl number of 32.

To 2,000 parts of the above described crude polyether polyol, 30 parts of water and 11 parts of basic magnesium carbonate are added under vigorous agitation in a pressure vessel. This is followed by the addition, at 50 to 60° C., of carbon dioxide for such a period of time that the pressure in the vessel rises to 2 atmosphere excess pressure and remains constant at this level for 3 hours. Subsequently the reaction vessel is vented and the water is distilled off under reduced pressure at 100° C. down to a residual water content of 0.12 percent by weight, based on the total reaction mixture. To the so obtained reaction mixture, 4 parts of silica gel based filter-aid are added with agitation, and the reaction mixture is filtered after one hour by means of a filter press to remove the insoluble salts. A water clear, oily polyether polyol with a residual potassium ion content of less than 0.5 p.p.m. and magnesium ion content of less than 0.4 p.p.m. is obtained which is suitable for the manufacture of polyurethane foams.

COMPARISON EXAMPLE IA

When a polyether polyol is prepared analogous to the details of Example I, but without the addition of a basic magnesium salt, a polymerisate with a potassium ion content of 34 p.p.m. is obtained.

EXAMPLE II

To 30 parts of crude polyether polyol which was prepared according to the details given in Example I, 0.1 parts of magnesium hydroxide and 0.3 parts of water are added. Subsequently carbon dioxide is conducted into the reaction mixture at 50 to 60° C. for such a period of time that the pressure in the reaction vessel rises to 3 atmospheres excess pressure and this pressure holds steady for 5 hours. Then the reaction vessel is vented and the water is removed under reduced pressure at 100° C. down to a residual content of 0.1% by weight of water, based on the total reaction mixture. After addition of 0.3 parts of a filter-aid, on silicate basis, the insoluble salts are removed with the aid of a filter press. A water clear, oily polyether polyol with a potassium ion content of 2 p.p.m., sodium ion content of 2 p.p.m. and magnesium ion content of less than 0.5 p.p.m. is obtained, which according to well known methods can be used in excellent manner for the preparation of polyurethane foams.

EXAMPLE III

To 1,000 parts of polyethylene oxide with an OH number of approximately 270 and a potassium ion content of 148 p.p.m., 13.6 parts of magnesium hydroxide and 40 parts of water are added with agitation. This is followed by the addition of carbon dioxide into the reaction mixture for such a period of time that the pressure in the vessel rises to 4 atmospheres excess pressure and this pressure is maintained for 5 hours at a constant level. Subsequently at 100° C. and 3 mm. mercury the water and any possible remaining volatile side products are distilled off and 2 parts of filter-aid are added to the distillation residue with stirring. After removing the inorganic components by filtration, a water soluble, oily polyether polyol with a potassium ion content of 9 p.p.m. is obtained.

The embodiments of the invention in which an exclusive property or privilege is claimed are defined as follows:

1. In the process for making polyalkylene ethers by the polymerization of alkylene oxides containing 2 to 4 carbon atoms in the alkyl chain in the presence of a basic catalyst followed by the subsequent inactivation of said catalyst, said basic catalyst being selected from the group consisting of alkali metal alkoxide containing 1 to 4 carbon atoms in the alkyl chain and alkali metal hydroxides, the improvement comprising:

precipitating each part of said catalyst with 1 to 100 parts of a basic magnesium salt and 1 to 20 parts of carbon dioxide are added for each part of basic magnesium salt, the neutralization being carried out at a temperature from 20° to 150° C. for a period of 0.5 to 2.0 hours and at an atmosphere excess pressure of 0.1 to 20, said basic magnesium salt being selected from the group consisting of magnesium hydroxide, magnesium oxide, magnesium carbonate, basic magnesium carbonate and mixtures thereof.

2. The process of claim 1 wherein the precipitation is carried out in the presence of water.

3. The process according to claim 2 wherein from 1 to 10 parts of water is added for each part of basic magnesium salt present.

4. The process of claim 3 wherein from 1 to 5 parts of water are added for each part of basic magnesium salt present.

5. The process of claim 1 wherein 1 to 20 parts of said basic magnesium salt are added and for each part of said basic magnesium salt there are added 2 to 10 parts of carbon dioxide.

References Cited

UNITED STATES PATENTS

| | | | |
|---|---|---|---|
| 3,053,903 | 9/1962 | Holland | 260—615 B |
| 2,983,763 | 5/1961 | Krause | 260—615 B X |
| 2,448,664 | 9/1948 | Fife et al. | 260—615 B |
| 3,299,151 | 1/1967 | Wismer et al. | 260—615 B |

HOWARD T. MARS, Primary Examiner

U.S. Cl. X.R.

260—569, 571, 573, 583 B, 584 B, 611 B, 613 B